United States Patent [19]

Nishihara

[11] 4,442,914

[45] Apr. 17, 1984

[54] FRONT WHEEL DRIVING DEVICE OF VEHICLE

[76] Inventor: Tadao Nishihara, Department of Technology, Iseki & Co., Ltd. 588-1, Doitacho, Matsuyama-shi, Ehime-ken, Japan

[21] Appl. No.: 417,333

[22] Filed: Sep. 13, 1982

[51] Int. Cl.³ ............................................. B60K 17/30
[52] U.S. Cl. ..................................... 180/255; 180/261
[58] Field of Search ............... 180/255, 260, 261, 262, 180/256, 257, 258, 259, 253, 254

[56] References Cited

U.S. PATENT DOCUMENTS

| | | | |
|---|---|---|---|
| 1,861,594 | 6/1932 | Clifton | 180/261 |
| 3,469,647 | 9/1969 | Brown | 180/255 |
| 3,980,151 | 9/1976 | Murayama et al. | 180/261 |
| 4,301,886 | 11/1981 | Kinoshita et al. | 180/261 |

Primary Examiner—David M. Mitchell
Assistant Examiner—D. Lynn Fugate
Attorney, Agent, or Firm—Arthur T. Fattibene

[57] ABSTRACT

A front wheel driving device for agricultural vehicle or the like. The device has a front axle housing accommodating a front wheel drive shaft. An inner gear case is attached to the outer side of the front axle housing. An outer gear case is steerably secured to the inner gear case. A planetary gear mechanism is adapted to be driven by the front wheel drive shaft through bevel gear mechanisms, and is supported by an intermediate seat which is fitted in the outer gear case. The arrangement is such that, when a cover supporting the front wheel axle is coupled to the outer side of the outer gear case, the front wheel axle is automatically fitted to the output shaft of the planetary gear mechanism.

6 Claims, 2 Drawing Figures

FRONT WHEEL DRIVING DEVICE OF VEHICLE

BACKGROUND OF THE INVENTION

The present invention relates to a front wheel driving device of a vehicle, making use of a planetary gear mechanism as the final stage of the speed reduction.

Such a front wheel driving device has been known as making use of a planetary gear system as the final stage of the speed reduction, in order to reduce the size of the gear case while obtaining a sufficiently large speed reduction ratio. This kind of front wheel device is disclosed, for example, in the specification of the U.S. Pat. No. 3,469,647. This type of front wheel driving device, however, is extremely difficult to assemble. For instance, in the known device disclosed in the above-mentioned specification, it is necessary to connect the front wheel axle to the output shaft of the planetary gear mechanism simultaneously with the assembling of the gears of the planetary gear mechanism, because the axial stopper for the front wheel axis is disposed in the vicinity of the inner side of the front wheel axle, i.e. in the vicinity of the point of meshing between the sun gear and the planetary gear. In consequence, the work has to be done in a restricted space and, in addition, the state of meshing of gears in the planetary gear mechanism can hardly be checked.

SUMMARY OF THE INVENTION

Accordingly, an object of the invention is to provide a front wheel driving device for vehicle, improved to overcome the above-described problems of the prior art.

To this end, according to the invention, there is provided a front wheel driving device for vehicles comprising: a front axle housing accommodating a front wheel driving shaft; an inner gear case attached to the outer end of the front axle housing; an outer gear case fitted to the inner gear case for free steering rotation; a planetary gear mechanism adapted to be driven by said front wheel driving shaft through a bevel gear mechanism and supported by an intermediate seat adapted to be fitted in the outer gear case; and a front wheel axle to which a front wheel is secured and supported by a cover, the front wheel axle being adapted to fit the output shaft of the planetary gear mechanism when the cover is coupled to the outer end of the outer gear case.

According to this arrangement, the planetary gear mechanism can be assembled before attaching the front wheel axle, so that it is possible to observe and check the state of meshing of the gears in the planetary gear mechanism. Furthermore, the work for coupling the front wheel axle to the output shaft is facilitated considerably. In addition, the size of the device as a whole can be reduced sufficiently while achieving a large speed reducing ratio, thanks to the combination of the bevel gear mechanism and the planetary gear mechanism. The planetary gear mechanism is disposed at a lateral side of the bevel gear mechanism and is made to have a height substantially equal to that of the bevel gear mechanism. In consequence, the sizes of the inner and outer gear cases are reduced to increase the road clearance to ensure a safer driving on rough roads or the like. In addition, a closed driving case is formed by the front axle housing, inner gear case, outer gear case and the cover supporting the front wheel axle, so that the invasion by foreign matters such as water, mud and so forth is prevented even if the vehicle is used in muddy and wet ground such as a paddy field.

The above and other objects, features and advantages of the invention will become more clear from the folowing description of the preferred embodiment taken in conjunction with the accompanying drawings.

DESCRIPTION OF THE PREFERRED EMBODIMENT

Figure 1:
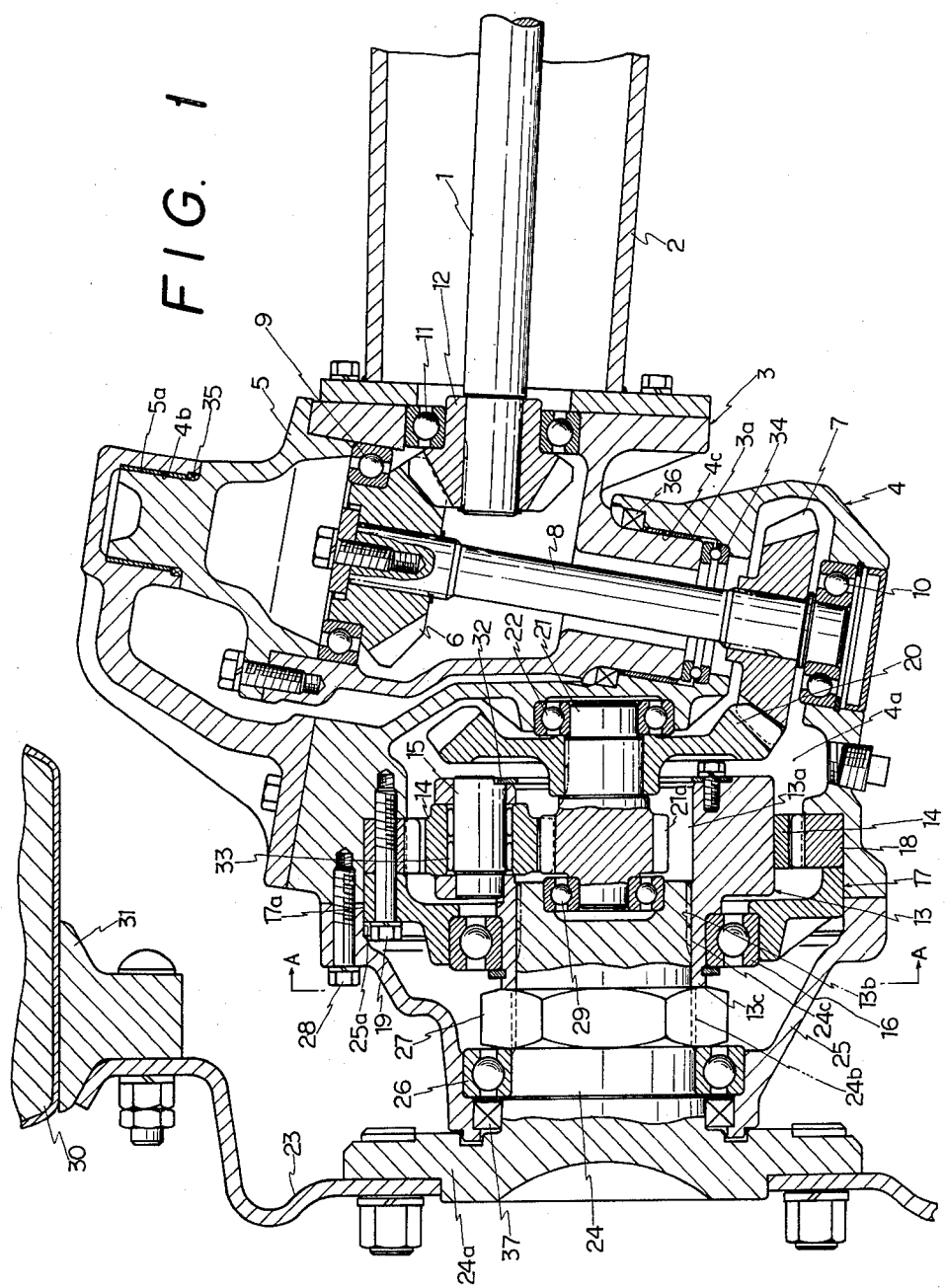
FIG. 1 is a vertical sectional front elevational view of a front wheel driving device in accordance with an embodiment of the invention.
Figure 2:
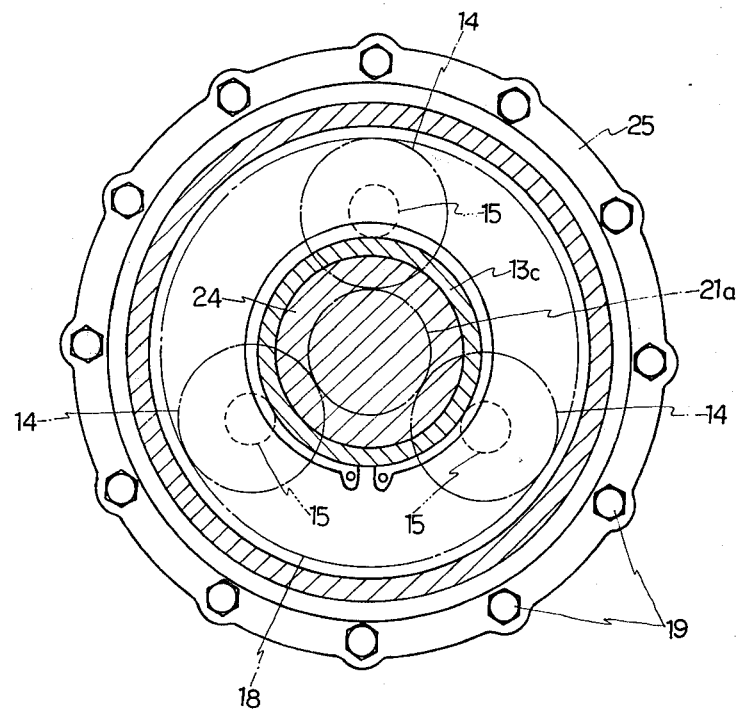
FIG. 2 is a sectioal view taken along the line A—A of FIG. 1.

Referring to the drawings, a front axle housing 2 houses a front wheel drive shaft 1. An inner gear case 3 provided at its lower portion with a tubular journal boss 3a is attached to the outer side of the front axle housing 2. An outer gear case 4 has an upwardly opening gear room 4a, an upper journal hole 4b and a lower journal hole 4c. An upper journal hole 4b is rotatably fitted to a journal boss 5a on an upper cover 5 fitting to the upper end opening of the inner gear case 3, while a lower journal hole 4c is rotatably secured to a journal boss 3a. A steering central shaft 8 has bevel gears 6 and 7 fixed to the upper and lower ends thereof. The shaft 8 is supported through the bevel gear 6 by means of a bearng 9 on the inner gear case and by means of a bearing 10 on the outer gear case, in such a manner that the shaft 8 is coaxial with the upper journal boss 5a and the lower journal boss 3a. A bevel gear 12 is fixed to the outer portion of a front wheel drive shaft 1 supported by a bearing 11. The bevel gear 12 is engaged by the upper bevel gear 6 to form an upper bevel gear mechanism.

A carrier 13 has a central bore 13a and a spline hole 13b and carries at its peripheral portion a plurality of shafts 15 which carry planet gears 14. A bearing 16 has an inner race which fits around the output shaft 13c formed at the outside of the carrier 13. An intermediate seat 17 fitted to the outer face of the bearing 16 and an internally-toothed ring gear 18 are secured to the outer side of the outer gear case 4 by means of bolts 19. According to this arrangement, the planet gears 14 and the carrier 13 are exposed to the gear room 4a. In addition, a sun gear shaft 21 integral with a sun gear 21a and fitting to a bevel gear 20 is supported by the inner wall of the gear room 4a by means of a bearing 22. In consequence, the bevel gear 20 meshes with the lower bevel gear 7 to form a lower bevel gear mechanism. When the carrier 13 is secured to the outer gear case 4 together with the ring gear 18 and the intermediate seat 17, the sun gear 21a meshes with the planet gears 14 thereby to form a planetary gear system consisting of the planet gears 14 meshing with the sun gear 21a and the ring gear 18 and the carrier 13.

A front wheel axle 24 is provided at its outer end with a seat 24a for mounting a wheel disc 23 and also with a male screw thread 24b and a spline boss 24c. The front wheel axle 24 is inserted into the cover 25 and is fitted into the inner race of a bearing 26 which has an outer race fitting in the cover 25. A nut 27 is screwed to the male screw thread 24b thereby to fix the inner race of the bearng 26 with respect to the cover 25. When the cover 25 is coupled to the outer end of the gear case 4 by means of bolts 28, the outer end portion of the sun gear shaft 21 is supported by the inner side of the wheel axle 24 through a bearing 29 and, at the same time, the spline boss 24c of the wheel axle 24 is fitted in the spline hole 13b of the output shaft 13c.

In the illustrated embodiment of the invention, the planetary gear mechanism is constructed to have a height substantially equal to the upper and lower bevel gear mechanism. The arrangement is such that, when the cover 25 is coupled to the outer side of the outer gear case 4, the inner peripheral surface 25a of the inner end of the cover 25 outwardly projecting from the outer side of the gear case 4 to facilitate the achievement of axial alignments between the sun gear shaft 21 and the front wheel axle 24 and between the output shaft 13c and the front wheel axle 24. In adition, in the state that the cover 25 has been secured to the outer gear case 4, the inner side portion of the nut 27 abuts the outer side of the output shaft 13c, so that the nut 27 plays the double role of axial stopper for the output shaft 13c and axial stopper for the bearing 26. A rim 31 mounting a front wheel 30 is secured to the outer periphery of the wheel disc 23. A reference numeral 32 denotes stopper rings by which the shafts 15 are fixed to the carrier 13, while 33 denotes a needle bearing. A numeral 34 denotes a thrust bearing, while numerals 35,36 and 37 denote oil seals.

Therefore, as a knuckle arm (not shown) secured to the outer gear case 4 is steered by a steering mechanism, the outer gear case 4, front wheel axle 24 and the front wheel 30 secured to the latter are swung around the upper journal boss 5a, lower journal boss 3a and the steering center shaft 8. As the front wheel driving shaft 1 is driven through a front differential gear (not shown), the sun gear shaft 21 is driven through the upper and lower bevel gear mechanisms so that the carrier 13 is rotated at a speed much lower than the speed of rotation of the sun gear shaft 21 due to the meshing of the planet gears 14 with the ring gear 18. In consequence, the front wheel axle 24 and, hence, the front wheel 30 are rotated at a sufficiently reduced speed.

In the front wheel driving device of the invention, as has been described, the planetary gear mechanism is supported by the intermediate seat 17 which in turn is fitted in the outer gear case 4. When the cover 25 supporting the front wheel axle 24 is coupled to the outer side of the outer gear case 4, the front wheel axle 24 just fits in the output shaft 13c of the planetary gear mechanism. It is, therefore, possible to observe and check the state of the gears of the planetary gear mechanism before the outer end of the outer gear case 4 is closed by the cover 25. Namely, it is possible to easil check the state of meshing of the planet gears 14 and the ring gear 18 and so forth visually so that the adjustment of meshing condition is faclitated advantageously. Since the coupling of the front wheel axle 24 to the output shaft 13c of the planetary gear mechanism is completed by fitting the cover 25 to the outer gear case 4, the assembling of the device as a whole is made in quite an easy manner. The size of the device as a whole is remarkably reduced and, hence, the weight and cost are reduced while attaining a large speed reduction ratio, thanks to the combination of the bevel gear mechanisms and the planetary gear mechanism. In addition, since the front axle housing 2, inner gear case 3, outer gear case 4 and the cover 25 supporting the front wheel axle 24 in combination form a closed case, water and mud are prevented from coming into the device even if the vehicle runs on wet and muddy ground such as paddy field.

In the case where the installation height of the planetary gear mechanism is made substantially equal to that of the upper and lower bevel gear mechanisms, the configuration of the outer gear case 4 and the cover 25 accomodating these parts are made substantially flat and positioned substantially at the same height. This conveniently increases, in combination with the reduced size of the device as a whole, the height of the lowermost portion of the device. This means that the road clearance during running is increased so that the vehicle can safely clear a ridge in the paddy field.

In the embodiment in which the cover 25 is coupled to the outer gear case 4 while being guided by the outer peripheral surface 17a of the intermediate seat 17, it is possible to easily attain the axial alignment between the sun gear shaft 21 and the front wheel axle 24 and between the output shaft 13c and the front wheel axle 24, so that the assembling of the shafts is very much facilitated. Furthermore, in the embodiment in which the nut 27 is screwed to the front wheel axle 24 serves as an axial stopper for the bearing 26 by which the front wheel axle 24 is supported on the cover 25 and an axial stopper for the output shaft 13c, the axial stopping of the front wheel axle 24 in relation to the output shaft 13c is directly achieved by the coupling of the cover 25 to the outer gear case 4. This remarkably simplifies the assembling work as compared with the conentional device in which the axial stopper has to be positioned in the vicinity of the inner side of the front wheel axle.

What is claimed is:

1. A front wheel driving device for vehicles comprising: a front axle housing accommodating a front wheel driving shaft; an inner gear case attached to an outer end of the front axle housing; an outer gear case fitted to the inner gear case for free steering rotation; a planetary gear mechanism adapted to be driven by said front wheel driving shaft through a bevel gear mechanism and supported by an intermediate seat adapted to be fitted in the outer gear case; and a front wheel axle to which a front wheel is secured and supported by a cover, the front wheel axle being adapted to fit an output shaft of the planetary gear mechanism when the cover is coupled to an outer end of the outer gear case.

2. A front wheel driving device for vehicles according to claim 1, wherein the planetary gear mechanism is disposed at a lateral side of the bevel gear mechanism substantially at the same installation height as the latter.

3. A front wheel driving device for vehicles according to claim 1 or 2, wherein said cover is adapted to be coupled to the outer gear case while being guided by an outer peripheral surface of the intermediate seat.

4. A front wheel driving device for vehicles according to claim 1 further comprising a nut screwed to the front wheel axle, the nut serving as an axial stopper for a bearing by which the front wheel axle is supported by the cover and also as an axial stopper for the output shaft.

5. A front wheel driving device for vehicles according to claim 2 further comprising a nut screwed to the front wheel axle, the nut serving as an axial stopper for a bearing by which the front wheel axle is supported by the cover and also as an axial stopper for the output shaft.

6. A front wheel driving device for vehicles according to claim 3 further comprising a nut screwed to the front wheel axle, the nut serving as an axial stopper for a bearing by which the front wheel axle is supported by the cover and also as an axial stopper for the output shaft.

* * * * *